US009512287B2

(12) United States Patent
Rhine et al.

(10) Patent No.: US 9,512,287 B2
(45) Date of Patent: *Dec. 6, 2016

(54) MODIFIED HYBRID SILICA AEROGELS

(71) Applicant: ASPEN AEROGELS, INC., Northborough, MA (US)

(72) Inventors: Wendell E Rhine, Belmont, MA (US); Decio Coutinho, Marlborough, MA (US); Kiranmayi Deshpande, Lake Forest, CA (US)

(73) Assignee: ASPEN AEROGELS, INC., Northborough, MA (US)

( * ) Notice: Subject to any disclaimer, the term of this patent is extended or adjusted under 35 U.S.C. 154(b) by 16 days.

This patent is subject to a terminal disclaimer.

(21) Appl. No.: 14/536,735

(22) Filed: Nov. 10, 2014

(65) Prior Publication Data
US 2015/0065590 A1    Mar. 5, 2015

Related U.S. Application Data

(63) Continuation of application No. 13/307,919, filed on Nov. 30, 2011, now Pat. No. 8,906,973.

(60) Provisional application No. 61/417,892, filed on Nov. 30, 2010.

(51) Int. Cl.
*C08J 9/28* (2006.01)
*C01B 33/158* (2006.01)

(52) U.S. Cl.
CPC ............ *C08J 9/286* (2013.01); *C01B 33/1585* (2013.01); *C08J 2201/0504* (2013.01); *C08J 2383/04* (2013.01)

(58) Field of Classification Search
CPC .................. C01B 33/1585; C08J 9/286; C08J 2201/0504; C08J 2383/04
See application file for complete search history.

(56) References Cited

U.S. PATENT DOCUMENTS

| | | |
|---|---|---|
| 2,188,007 A | 1/1940 | Kistler |
| 4,363,738 A | 12/1982 | Kummermehr |
| 4,447,345 A | 5/1984 | Kummermehr et al. |
| 4,619,908 A | 10/1986 | Cheng et al. |
| 4,667,417 A | 5/1987 | Graser et al. |
| 4,717,708 A | 1/1988 | Cheng et al. |
| 5,275,796 A | 1/1994 | Tillotson et al. |
| 5,306,555 A | 4/1994 | Ramamurthi et al. |
| 5,565,142 A | 10/1996 | Deshpande et al. |
| 5,786,059 A | 7/1998 | Frank et al. |
| 5,789,075 A | 8/1998 | Frank et al. |
| 5,830,387 A | 11/1998 | Yokogawa et al. |
| 5,866,027 A | 2/1999 | Frank et al. |
| 5,962,539 A | 10/1999 | Perrut et al. |
| 5,972,254 A | 10/1999 | Sander |
| 5,973,015 A | 10/1999 | Coronado et al. |
| 6,068,882 A | 5/2000 | Ryu |
| 6,080,475 A | 6/2000 | Frank et al. |
| 6,083,619 A | 7/2000 | Frank et al. |
| 6,087,407 A | 7/2000 | Coronado et al. |
| 6,127,306 A | 10/2000 | Husing et al. |
| 6,140,377 A | 10/2000 | Schwertfeger et al. |
| 6,187,250 B1 | 2/2001 | Champagne |
| 6,197,270 B1 | 3/2001 | Sonoda et al. |
| 6,479,416 B1 | 11/2002 | Frank et al. |
| 6,620,355 B1 | 9/2003 | Schmidt |
| 6,656,527 B1 | 12/2003 | Gessner et al. |
| 6,670,402 B1 | 12/2003 | Lee et al. |
| 6,887,563 B2 | 5/2005 | Frank et al. |
| 6,989,123 B2 | 1/2006 | Lee et al. |
| 7,074,880 B2 | 7/2006 | Rhine et al. |
| 7,078,359 B2 | 7/2006 | Stepanian et al. |
| 7,378,450 B2 | 5/2008 | Erkey |
| 7,399,439 B2 | 7/2008 | Lee et al. |
| 7,402,293 B2 | 7/2008 | Meyer et al. |
| 7,504,346 B2 | 3/2009 | Stepanian et al. |
| 7,691,912 B2 | 4/2010 | Ou et al. |
| 7,780,890 B2 | 8/2010 | Lee et al. |
| 8,067,478 B1 | 11/2011 | Meador et al. |
| 8,214,980 B2 | 7/2012 | Bullock et al. |
| 2005/0192366 A1 | 9/2005 | Ou et al. |
| 2005/0192367 A1 | 9/2005 | Ou et al. |
| 2007/0152363 A1 | 7/2007 | Begag et al. |
| 2010/0155644 A1 | 6/2010 | Ou et al. |
| 2012/0097907 A1 | 4/2012 | Bauer et al. |

*Primary Examiner* — Irina S Zemel
(74) *Attorney, Agent, or Firm* — Mark Hanson; Poongunran Muthukumaran

(57) ABSTRACT

Disclosed and claimed herein are hybrid silica aerogels containing non-polymeric, functional organic materials covalently bonded at one or both ends to the silica network of the aerogels through a C—Si bond between a carbon atom of the organic material and a silicon atom of the aerogel network. Methods of their preparation are also disclosed.

20 Claims, No Drawings

MODIFIED HYBRID SILICA AEROGELS

REFERENCE TO PRIOR FILED APPLICATION

This application is a continuation of U.S. patent application Ser. No. 13/307,919, filed Nov. 30, 2011, which claims the benefit of U.S. Provisional Application 61/417,892, filed Nov. 30, 2010, under 35 U.S.C. §119(e); which applications are incorporated by reference herein in their entirety.

STATEMENT OF GOVERNMENT SUPPORT

The subject matter of the present application was made with Government support from the National Aeronautics and Space Administration under Contract No. NNX09CE82P and Contract No. NNX10CB23C. The Government may have certain rights to the subject matter of the present application.

FIELD OF THE INVENTION

The present application for patent is in the field of hybrid silica aerogels and more specifically in the field of modified hybrid silica aerogel compositions containing a non-polymeric, functional organic material covalently bonded at one or both ends to the silica network of the aerogel through a C—Si bond between a carbon atom of the organic material and a silicon atom of the aerogel network. Methods of their preparation are also disclosed.

BACKGROUND

There are many areas in which materials that provide thermal insulation are required. The exploration of space requires new technologies for long term cryogenic propellant storage applications in space, on the lunar surface, and on the earth. Thermal insulating materials help to lower the energy requirements to keep a substance hot or cold. High performance thermal insulation materials are needed to insulate cryotanks at both low and high temperatures on launch vehicles as well as cryogenic fluid storage tanks.

Further, reusable and cost effective insulation materials are of high interest in many industries. One example is the space industry where reusable, safe, reliable, lightweight and cost effective components in launch vehicles and spacecraft components are desired. Of particular interest are reusable launch vehicles (RLVs) designed to reduce the cost of access to space thereby promoting creation and delivery of new space services and other activities that can improve economic competitiveness. A target area for furthering this technology lies in design and development of reusable integrated insulation systems comprising lightweight composite materials. For example, cryogenic tank insulation materials currently employed provide sufficient thermal performance but are far from optimizing weight reduction and are not stable enough for integration into RLVs. Examples of these materials are organic foams based on polyetherimide, polyurethane, polyimide and other such compounds.

Silica aerogels are the best known thermal insulating materials available. However, the mechanical strength of these aerogels needs to be improved to meet the requirements of these applications. Improvements in the strength of aerogels would allow these materials to be used as advanced non-compacting insulation materials capable of retaining structural integrity while accommodating larger operating temperatures ranging from cryogenic to elevated temperatures.

Many silica containing aerogels crosslinked with organic polymers have been disclosed; see, for example, US Patent Application No. 2006/0286360 and U.S. Pat. No. 7,691,912 to Rhine et al. The mechanical strength of aerogel materials can be increased by reinforcing them with organic crosslinking agents. For example, polyimide materials have excellent thermal, mechanical and electronic properties compared to other organic polymeric materials, due to the highly rigid molecular structures. U.S. Pat. No. 7,074,880 to Rhine et al. discloses polymeric imides to which poly (dimethylsiloxane) has been attached and U.S. Pat. No. 7,074,880 to Rhine et al. discloses polyimides which are modified with silica, alumina and the like. In these disclosures, a majority of the materials are organic in nature. As such they deviate significantly from silica based aerogels. Based on previous results, it is not clear what properties a non-polymeric organic silica composite would have in terms of its mechanical strength in combination with its thermal insulating properties.

Therefore, there remains a need for light-weight silica aerogels which incorporate the excellent thermal conductivity properties of silica aerogels while incorporating the mechanical strength provided by organic crosslinking materials.

DETAILED DESCRIPTION OF THE DISCLOSURE

This disclosure introduces a solution to the problem of combining high mechanical strength, low thermal conductivity and low weight of silicon-based aerogels by incorporating a non-polymeric, functional organic material into a silica aerogel wherein the organic material is covalently bonded to one or more silicon atoms of the silicon aerogel network. It has surprisingly been found that addition of selected amounts of bis-trialkoxysilanes connected by a non-polymeric, functional organic material to silica aerogel precursors provides for highly porous hybrid silica aerogels that have low thermal conductivity, good mechanical strength, improved bonding, better hydrolytic stability and lower weight compared to silica aerogels prepared without the bis-trialkoxysilanes connected by non-polymeric, functional organic materials. The functional groups in the aerogel matrix also provides increased bonding intramolecularly to strengthen the aerogel as well as intermolecularly to provide increase bonding strength of the aerogel to surfaces or solid phase additive. The disclosure also provides methods for preparing the hybrid aerogels.

As used herein, the conjunction "and" is intended to be inclusive and the conjunction "or" is not intended to be exclusive unless otherwise indicated. For example, the phrase "or, alternatively" is intended to be exclusive.

The use of the terms "a" and "an" and "the" and similar referents in the context of describing the invention (especially in the context of the claims) are to be construed to cover both the singular and the plural, unless otherwise indicated herein or clearly contradicted by context.

The terms "comprising," "having," "including," and "containing" are to be construed as open-ended terms (i.e., meaning "including, but not limited to,") unless otherwise noted.

As used herein the phrase "dipodal trialkoxy silanes" refer to materials containing two trialkoxysilanes connected to each other by at least one carbon containing fragment.

As used herein the phase "functional dipolar trialkoxysilane" refers to dipodal trialkoxysilanes which are connected to each other by fragments that contain useful functionalities.

As used herein the term "functional" refers to a useful property imparted by the material which the term describes, and transfers that property to the product in which it is a part.

As used herein the phrase "amine-epoxy adduct" refers to the reaction product created from the reaction of an amine with an epoxy.

Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

In a first embodiment, disclosed and claimed herein are hybrid silica aerogel compositions composed of non-polymeric, functional organic materials covalently bonded at one or both ends to the silica network through a C—Si bond between a carbon atom of the organic material and a silicon atom of the network, which do not contain a urea or urethane functionality in the organic material.

In a second embodiment, disclosed and claimed herein are hybrid silica aerogel compositions composed of non-polymeric, functional organic materials covalently bonded at one or both ends to the silica network through a C—Si bond between a carbon atom of the organic material and a silicon atom of the network, which do not contain a urea or urethane functionality in the organic material, wherein the non-polymeric, functional organic material is an amine-epoxy adduct.

In a third embodiment, disclosed and claimed herein are hybrid silica aerogel compositions of the above embodiments wherein the functional, non-polymeric organic material comprises branched or unbranched alkyl chains of C1-C40 with at least one of OH, NHR, SH, OH-terminated alkoxy, carboxy, phenolic groups are attached to the chain, and wherein a heteroatom may optionally be a part of the chain.

In a fourth embodiment, disclosed and claimed herein are hybrid silica aerogel compositions of the above embodiments further containing a functional additive such as an opacifying compound.

In a fifth embodiment, disclosed and claimed herein are hybrid silica aerogel compositions of the above embodiments wherein the composition is reinforced with fibers.

In a sixth embodiment, disclosed and claimed herein are methods of preparing hybrid silica aerogel compositions containing the steps of combining at least one tetraalkoxysilane which may optionally be partially hydrolyzed (polyethylsilicate such as the commercially available Silbond 40) or hydrolyzed (such as the commercially available Silbond H-5), at least one dipodal trialkoxysilane covalently bonded to at least one end of a non-polymeric, functional organic material which does not contain a urea or urethane linkage, and a gelation catalyst to gel the admixture, and drying the gel to obtain an aerogel.

In a seventh embodiment, disclosed and claimed herein are methods of preparing hybrid silica aerogel compositions containing the steps of combining at least one tetraalkoxysilane which may optionally be partially hydrolyzed or hydrolyzed, at least one dipodal trialkoxysilane covalently bonded to at least one end of a non-polymeric, functional organic material which does not contain a urea or urethane linkage, and a gelation catalyst to gel the admixture, and drying the gel to obtain an aerogel, wherein the non-polymeric, functional organic material is an amine-epoxy adduct.

In an eighth embodiment, disclosed and claimed herein are method for preparing hybrid silica aerogel compositions of the above method embodiments wherein the functional, non-polymeric organic material comprises branched or unbranched alkyl chains of C1-C40 with at least one of OH, NHR, SH, OH-terminated alkoxy, carboxy, phenolic groups are attached to the chain, and wherein a heteroatom may optionally be a part of the chain.

In a ninth embodiment, disclosed and claimed herein are methods of preparing hybrid silica aerogel compositions of the above method embodiments further containing an aging step after the gelation step, comprising contacting the silanes with an amine containing material.

In a ninth embodiment, disclosed and claimed herein are methods of preparing hybrid silica aerogel compositions of the above method embodiments wherein the tetraalkoxysilane comprises between about 10 and about 75% of hydrolyzed siloxane.

In a tenth embodiment, disclosed and claimed herein are methods of preparing hybrid silica aerogel compositions of the above method embodiments wherein the methods include adding a functional additive such as an opacifying component.

In an eleventh embodiment, disclosed and claimed herein are methods of preparing hybrid silica aerogel compositions of the above method embodiments wherein the methods include adding reinforcing fibers.

In an eleventh embodiment, disclosed and claimed herein are methods of preparing hybrid silica aerogel compositions of the above method embodiments wherein the gel is dried using supercritical carbon dioxide.

The present application discloses and claims novel hybrid materials comprising a porous silica network reinforced with organic materials covalently bound therein and methods for their preparation. Useful organic materials include, for example, long or short chain, linear or branched organic molecules that are non-polymeric. It has surprisingly been found that adding dipodal silanes that are covalently bonded to non-polymeric, functional organic materials to silica aerogels results in a significant impact on the bonding, hydrolytic stability, and mechanical strengths of the obtained hybrid materials, as well as low thermal conductivity and lower weight.

The present disclosure is concerned with non-polymer organic materials, or constituents, connected to two or more trialkoxysilanes. Selecting shorter organic materials provide better tensile strength along the chain length of the non-polymeric organic material than a polymer which may need to go through conformational changes (under a tensile load along the polymer chain) before providing additional strength. Also, using shorter organic materials, or constituents, more bonding with the silica network results since the larger polymers can experience more steric hindrance.

The hybrid silica aerogel compositions of the present disclosure provide significantly better thermal performance than conventional foams. Furthermore, the hybrid silica aerogels of the current disclosure are thermally stable and thus present excellent candidates for RLVs functioning as insulation for cryogenic fuel (Liquid H2, O2, etc.) tanks inter alia.

The present disclosure provides for hybrid silica aerogel compositions containing a non-polymeric, functional organic material covalently bonded at one or both ends to the silica network through a C—Si bond between a carbon atom of the organic material and a silicon atom of the network and method of their preparation Non-polymeric, functional organic materials covalently bonded at one or both ends the silica network are prepared by reacting trialkoxysilane precursors which are bonded to the organic material, as represented by $(RO)_3Si—R'—Si(OR'')_3$ wherein RO and R''O may be the same or different and represent any hydrolysable group, such as, for example, methoxy, ethoxy or propoxy groups. R' is a non-polymeric, functional organic material. R' may be branched or unbranched, straight chain alkyl groups containing 1-24 carbon atoms. The alkyl groups may also be substituted along the chain with heteroatoms, such as, for example, O, N, S, P, and B. In these cases the heteroatom allows for the non-polymeric material to have functionality. Other functional substituents may be present on the non-polymeric, organic material, including, for example, OH, OR, NHR, SH, SR, COOR, CONHR, Ph-OH, or branches containing these groups.

The hybrid silica aerogel compositions of the present disclosure are prepared by hydrolyzing the admixture of bis-trialkoxysilane non-polymeric, functional organic precursors and tetraalkoxy silanes in aqueous base followed by condensing the resulting silanol groups to form a wet gel. Examples of bis-trialkoxysilane non-polymeric, functional organic precursors are:

$(CH_3O)_3—Si—CH_2—CH_2—CH_2—NH—CH_2—CH_2—CH_2—Si—(OCH_3)_3$ and $(CH_3O)_3—Si—CH_2—CH_2—CH_2—NH—CH_2—CH_2—NH—CH_2—CH_2—CH_2—Si—(OCH_3)_3$ Other examples include the reaction product of epoxy materials with amines terminated trialkoxysilanes, such as the following example, where 3-glycidopropyl-trialkoxysilane (GLYMO) is reacted with 3-aminopropyl trialkoxysilane to obtain a functional dipodal silane. The reaction product is called an amine-epoxy adduct.

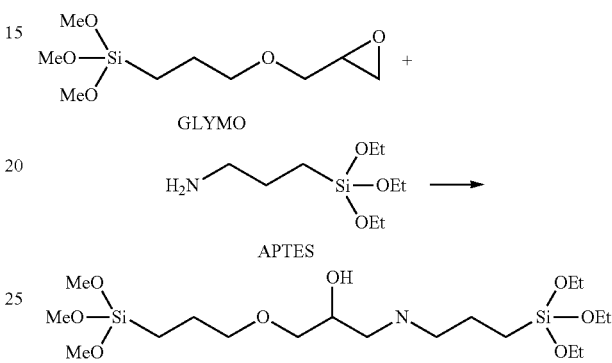

Diglycidyl compounds can also be used such as precursors for dipodal trialkoxysilanes such as 1,4-butanediol diglycidyl ether (BDGE) and bisphenol A propoxylate diglycidyl ether (BPGE) as illustrated below.

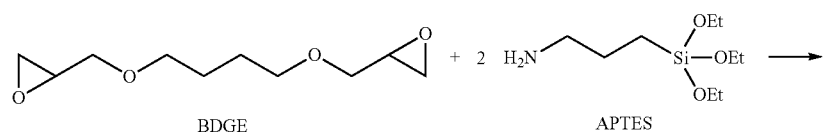

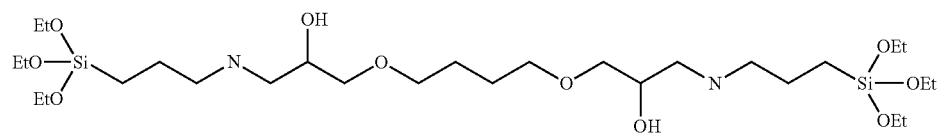

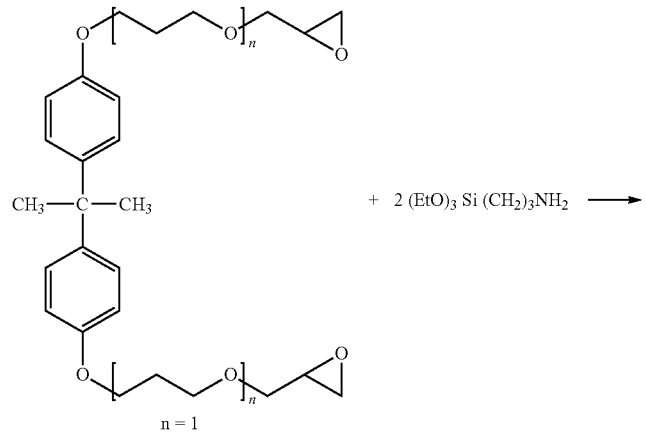

-continued

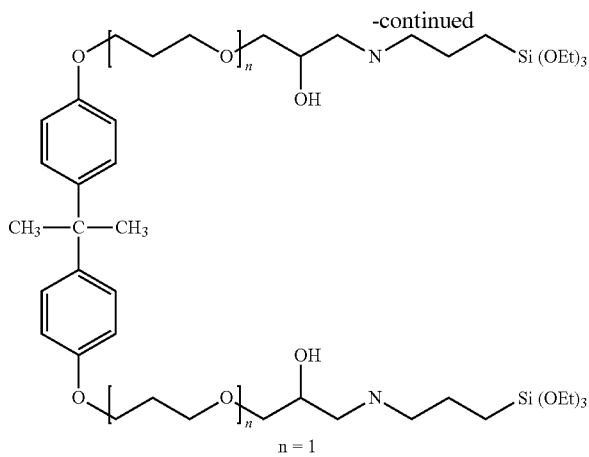

n = 1

As can be seen from their structures, the amine-epoxy adduct, which is the reaction product of an amine with an epoxy, contains functionality in the form of an OH attached to the chain as well as the heteroatoms, N and O, in the resultant chain. It should be recognized that any trialkoxysilane with an amine group attached to it through an organic moiety will react with a trialkoxysilane with an epoxy group attached to it through an organic moiety to prepare an amine-epoxy adduct suitable for incorporation into a silicon aerogel as described herein.

The tetraalkoxysilanes, $(RO)_4Si$, useful in the present application are any silanes which are capable of being hydrolyzed by water or with acidic or basic water, such as, for example, tetraethoxysilane (TEOS), tetramethoxysilane and tetrapropoxysilanes. The tetraalkoxysilane used in the present disclosure may be completely or partially hydrolyzed prior to reacting with bis-trialkoxysilane non-polymeric, functional organic. An exemplary reaction may be represented by the following:

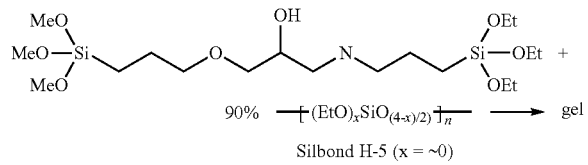

where (x) can range from 0-4 and (n) represents the average length of the silica polymer, oligomer or monomer.

The hybrid silica aerogel compositions of the current disclosure can also be reinforced using fiber-reinforcing components available in a variety of reinforcement forms such as, for example, microfibers, fibrous battings or lofty battings. A more detailed description on fiber reinforcement materials for aerogels can be found in US patent application 20020094426, the entire contents of which is herein incorporated by reference.

The hybrid silica aerogel compositions of the current disclosure may also include other functional additives such as an opacifying compounds which can be incorporated into the final hybrid aerogel at any step before the complete gelation of the hydrolyzed sol. Such opacifiers include but are not limited to, for example, $B_4C$, Diatomite, Manganese ferrite, SiC, MnO, NiO, SnO, $Ag_2O$, $Bi_2O_3$, TiC, WC, carbon black, graphite, graphene sheets, titanium oxide, iron titanium oxide, zirconium silicate, zirconium oxide, iron (II) oxide, iron (III) oxide, manganese dioxide, iron titanium oxide (ilmenite), chromium oxide, silicon carbide and any combination thereof.

The current application for patent also discloses and claims methods of preparing hybrid silica aerogel compositions including the steps of combining at least one tetraalkoxysilane which may optionally be partially hydrolyzed, as described supra and at least one dipodal trialkoxysilane covalently bonded to at least one end of a non-polymeric, functional organic material as described supra.

A gelation catalyst to gel the admixture may also be included. The wet gel is then dried to obtain an aerogel. The catalyst may be an aqueous acid or an aqueous base such as for example ammonia or triethylamine in water.

The resulting gel material may optionally be aged in ethanol at elevated temperatures, such as from about 50° C. to about 250° C. for a period of from 1 to 48 hrs. In the aging process the ethanolic solution may include an aging basic compound such as triethylamine or aqueous ammonia, or HMDS which also renders the hybrid silica aerogel composition hydrophobic, or the aging step may be conducted at room temperature.

Drying of the wet get can be accomplished using a variety of methods to obtain the desired hybrid silica aerogel porosity and structure. Methods of drying gels to obtain aerogels or xerogels are well known in the art. U.S. Pat. No. 6,670,402 teaches drying via rapid solvent exchange of solvent inside wet gels using supercritical $CO_2$ by injecting supercritical, rather than liquid, $CO_2$ into an extractor that has been pre-heated and pre-pressurized to substantially supercritical conditions or above to produce aerogels. U.S. Pat. No. 5,962,539 describes a process for obtaining an aerogel from a polymeric material that is in the form a sol-gel in an organic solvent, by exchanging the organic solvent for a fluid having a critical temperature below a temperature of polymer decomposition, and supercritically drying the fluid/sol-gel. U.S. Pat. No. 6,315,971 discloses processes for producing gel compositions comprising: drying a wet gel comprising gel solids and a drying agent to remove the drying agent under drying conditions sufficient to minimize shrinkage of the gel during drying.

One example of drying the hybrid aerogel of the current disclosure uses supercritical conditions of $CO_2$ including for example, first substantially exchanging the solvent present in the porosity of the gels by liquid $CO_2$ and in the second step heating the autoclave beyond the critical temperature of $CO_2$ which is 31.06° C. and increasing a pressure to a pressure greater than about 1070 psig. In an alternative way, the drying of aerogels is carried out directly by heating the autoclave beyond the critical temperature of $CO_2$. The system is kept at these conditions for at least an hour to be sure that all $CO_2$ is at its hypercritical conditions and to ensure that essentially all the solvent have been removed from the gel. After that, the autoclave is depressurized slowly to atmospheric pressure.

Pre-hydrolyzed TEOS, such as Silbond H-5 (SBH5) from Silbond Corp, which is hydrolyzed with a water/silica ratio of about 1.9-2, may also be use as received or may be further hydrolysed prior to addition into the reaction. Partially hydrolyzed TEOS or TMOS, such as polyethysilicate (Silbond 40) or polymethylsilicate may also be used as received or may be further hydrolyzed prior to addition into the reaction.

EXAMPLES

Preparation of GLYMO-APTES:

Equimolar amounts (0.01 mole) of 3-glycidylpropyl triethoxysilane and 3-aminopropyl triethoxysilane were admixed in 20 mL of ethanol and heated at 65° C. for 60 min. The reaction went to completion as evidenced by the absence of epoxy bands in an infrared spectrum of the resulting product. The mixture was used without purification.

Preparation of Aerogel 1 (50G-0.12)

Preparation and Properties of Silica/GLYMO-APTES Hybrid Aerogels

The gels were prepared using the formulations listed in Table 1. All gels were prepared similarly following the procedure for sample 1 (50G-0.12) as an example. To 27 g of tetraethoxysilane (TEOS) was added 40 mL ethanol and 12 g of water containing 0.01 g 70% nitric acid and mixed for 1 hr. The amount of acid can be adjusted to increase or decrease gel times without affecting the final properties of the aerogel. To this silica solution was added 12.80 g of GLYMO-APTES and diluted with ethanol to give a final volume of 174 mL and a solids concentration (target density) of 0.12 g/cc. This solution was stirred for 1 min and then poured into molds (to make triplicate samples equal portions were poured into 3 molds) and allowed to set for 24 hrs to gel to obtain monolithic gels. The weight of the GLYMO-APTES expected in the product is based on a molecular weight of 277 g/mol for the formula of $O_{1.5}Si(CH_2)_3OCH_2CHOHCH_2NH(CH_2)_3SiO_{1.5}$, and sample 1 (50G) will contain 7.80 g $SiO_2$ and 7.81 g of hydrolyzed GLYMO-APTES. The resultant gel was immersed in 200 mL of ethanol at 45-60° C. for 24 hrs to remove any water and unreacted GLYMO-APTES from the aerogel. The gels were then aged in 200 mL of a solution of 5% HMDZ in ethanol to incorporate trimethylsilyl groups to render the hybrid silica aerogel hydrophobic. To prepare samples 2-9, the amounts of GLYMO-APTES and the volume of ethanol were adjusted to give the desired wt % GLYMO-APTES and solids concentration (target density) indicated in Table 1.

The silica source can also be a hydrolyzed silica source such as Silbond H-5 which is available from Silbond Corporation and contains ~20% silica in ethanol. In the above preparation of sample 1, 39 g of Silbond H-5 would be substituted for the 28 g of TEOS. Since the SBH5 is prehydrolyzed, the hydrolysis step can be skipped and amount of water added adjusted accordingly.

TABLE 1

Formulations for aerogels 1-9.

| Sample | Wt % GLYMO-APTES | Wt % Silica | Water/Si mol ratio | HNO₃ Mol % | Conc. g/mL |
|---|---|---|---|---|---|
| 1 50G-0.12 | 50 | 50 | 3.53 | 0.0007 | 0.12 |
| 2 50G-0.09 | 50 | 50 | 3.53 | 0.0007 | 0.09 |
| 3 50G-0.05 | 50 | 50 | 3.53 | 0.0007 | 0.05 |
| 4 25G-0.12 | 25 | 75 | 3.53 | 0.0007 | 0.12 |
| 5 25G-0.09 | 25 | 75 | 3.53 | 0.0007 | 0.09 |
| 6 25G-0.05 | 25 | 75 | 3.53 | 0.0007 | 0.05 |
| 7 10G-0.05 | 10 | 80 | 3.53 | 0.0007 | 0.05 |
| 8 10G-0.09 | 10 | 80 | 3.53 | 0.0007 | 0.09 |
| 9 75G-0.09 | 75 | 25 | 3.53 | 0.0007 | 0.09 |

To make samples 10-13, sols were prepared containing 10, 25, 50 and 75% GLYMO-APTES at a concentration of solids of 0.035 g/cc as listed in Table 2. The preparation procedure is the same as described for sample 1. The crosslinking agent was prepared by reacting equimolar amounts of GLYMO and APTES at 75° C. for 2 hours, and the formation of GLYMO-ATPES was followed by IR.

TABLE 2

Formulations for aerogels 10-13.

| Sample | Wt % GLYMO-APTES | Wt % Silica | Water/Si mol ratio | HNO₃ Mol % | Conc. g/mL |
|---|---|---|---|---|---|
| 10 75G-0.035 | 75 | 25 | 3.53 | 0.007 | 0.035 |
| 11 50G-0.035 | 50 | 50 | 3.53 | 0.007 | 0.035 |
| 12 25G-0.035 | 25 | 75 | 3.53 | 0.007 | 0.035 |
| 13 10G-0.035 | 10 | 90 | 3.53 | 0.007 | 0.035 |

The appropriate sol containing 10, 25, 50 or 75% GLYMO-APTES was poured into molds containing the Quartzel® fiber reinforcement from Saint Gobain. The sol infiltrates the fiber reinforcement easily and the sols usually gel within 3-60 min depending on the GLYMO-APTES concentration. The gels were aged and then treated with HMDZ to make them hydrophobic. Resulting gels contained 10-75% of bis-triethoxysilyl compound were supercritically dried using $CO_2$.

It is important to note that the current disclosure can also be practiced using any concentration within the range of about 1-100% for the dipodal trialkoxysilane component. The monolithic hybrid aerogels of the current disclosure have higher compressive moduli than the corresponding silica aerogels with the same densities. However, the gels prepared using 100% of the GLYMO-APTES collapsed during supercritical drying.

Table 3 lists the moduli, compressive strengths, thermal conductivities and densities of the monolithic silica/GLYMO-APTES hybrids aerogels. The final density of the prepared aerogel hybrids depends directly on the target density and was not affected by the wt % of GLYMO-APTES added to the aerogel. In Table 3 the Compressive Modulus and Compressive Strength were determined using an Instron Model 5569 mechanical tester. The Thermal Conductivity was determined using calibrated hot plate devices that were made by Aspen Aerogels. The calibrated hot plate (CHP) devices were used to measure thermal conductivity of small, flat aerogel samples at room temperature. The CHP method is based on the principle underlying ASTM E 1225, *Standard Test Method for Thermal Conductivity of Solids by Means of the Guarded-Comparative-Longitudinal Heat Flow Technique*. The Final Densities were determined by the ratio of mass of the aerogel to the volume of the aerogel.

TABLE 3

Densities, thermal conductivities and moduli of GLYMO-APTES hybrid aerogels.

| Sample | Weight % of (GLYMO-APTES) | Target density (g/cc) | Bulk Density (g/cc) | Thermal conductivity (mW/m · K) | Modulus (MPa) | Comp. Strength (MPa) |
|---|---|---|---|---|---|---|
| 1-50G-0.12 | 50 | 0.12 | 0.275 | 22.1 | 31.63 | 0.97 |
| 2-50G-0.09 | 50 | 0.09 | 0.212 | 18.4 | 10.91 | 0.47 |
| 3-50G-0.05 | 50 | 0.05 | 0.128 | 14.5 | 1.48 | 0.15 |
| 4-25G-0.12 | 25 | 0.12 | 0.232 | N/A | 15.45 | 0.56 |
| 5-25G-0.09 | 25 | 0.09 | 0.201 | 15.6 | 8.68 | 0.31 |
| 6-25G-0.05 | 25 | 0.05 | 0.127 | 14.3 | 1.30 | 0.67 |
| 7-10G-0.05 | 10 | 0.05 | 0.129 | 13.4 | 1.26 | 0.04 |

As can be seen from Table 3, the thermal conductivity of the samples varied from 14 to 22 mW/m·k and increased as the final density increased. The compressive elastic modulus of the hybrids was determined from stress versus strain plots. Adding the bis-trialkoxysilane non-polymeric, functional organic compound to prepare the hybrid silica aerogel composition significantly improves the mechanical properties of the aerogels. The sample containing 10% of the bis-trialkoxysilane material has a density 0.129 g/cc and a compressive modulus of 1.26 MPa. The samples containing 25 and 50% of the bis trialkoxysilane material had densities of 0.127 and 0.128 g/cc and had moduli of 1.30 and 1.48 MPa which are higher than for the sample prepared with 10% GLYMO-APTES.

Characterization of Porosity

Porosity data of the hybrid silica aerogel compositions are listed in Table 2. Micro/meso porosity data were acquired on a Micromeritics ASAP 2010 Micropore Analyzer using $N_2$ gas. The samples were degasses at 100° C. in a vacuum for 18-24 hs before testing. Surface areas were calculated using Brunauer, Emmett and Teller (BET) multimolecular layer absorption model. Average pore sizes and cumulative pore volumes employed the Barrett, Jounerr and Halenda (BJH) model and were calculated from the desorption branch of the isotherms.

The surface areas and pore size distributions for PI-silica hybrid aerogels prepared using SBH5 were determined as reported in Table 5.

The pore volume was calculated using the formula:

Pore volume=$1/\rho_B - 1/\rho_S$ where $\rho_B$ is the bulk density and $\rho_S$ is the skeletal density.

As can be seen in Table 4, the BET surface area ranged between 431 (75G-09) and 919 (10G-0.09). Aerogels prepared with 10% of the bis-trialkoxysilane material possess narrow distribution and smaller pore diameters (9.83 nm). As the bis-trialkoxysilane material content increases, the pore volume decreases, the pores get larger, and the pore size distribution gets broader.

TABLE 4

Surface area and pore volume of hybrid aerogels.

| Sample | Weight % of (GLYMO + APTES) | Density (g/cc) | BET Surface area (m²/g) | BJH Desorption pore volume (cm³/g) | Calc. pore volume (cm³/g) | BJH Desorption Avg. pore diameter (nm) |
|---|---|---|---|---|---|---|
| 9-75G-0.09 | 75 | Sample Broke | 431 | 1.25 | N/A | 11.12 |
| 5-25G-0.09 | 25 | 0.201 | 857 | 3.46 | 4.41 | 13.74 |
| 8-10G-0.09 | 10 | Sample Broke | 919 | 2.99 | N/A | 9.83 |
| 1-50G-0.12 | 50 | 0.275 | 632 | 1.39 | 2.99 | 8.6 |
| 2-50G-0.09 | 50 | 0.212 | 630 | 2.38 | 4.07 | 14.47 |
| 3-50G-0.05 | 50 | 0.128 | 609 | 1.53 | 7.17 | 10.6 |

Fiber reinforced hybrid silica aerogel compositions of the current disclosure shown in Table 5. The thermal conductivity varied between 19-25 mW/m·K and increased as the bis-trialkoxysilane material content increased and the density decreased.

TABLE 5

Quartzel ® fiber reinforced hybrid silica aerogel compositions.

| Sample number | Sample Composition | Density (g/cc) | Thermal Conductivity (mW/m K) |
|---|---|---|---|
| 10 | 10% GLYMO-APTES | 0.065 | 18.7 |
| 11 | 25% GLYMO-APTES | 0.061 | 21.3 |
| 12 | 50% GLYMO-APTES | 0.055 | 24.3 |
| 13 | 75% GLYMO-APTES | 0.051 | 25.2 |

The compression strengths of the GLYMO-APTES crosslinked aerogels were determined. The moduli are listed in Table 6. The compression strengths of the aerogels decreased as the density decreased and as the amount of crosslinking agent. It is not clear at this point whether the decrease in strength is due to the decrease in density or is due to properties of the crosslinking agent. Unexpectedly, the sample with the 75% of the functional dipodal silane had a lower density and was more flexible than the sample containing only 10% of the functional dipodal silane.

TABLE 6

Density and thermal conductivity and modulus of the
GLYMO-APTES crosslinked aerogels prepared.

| Sample No | Sample Composition | Density (g/cc) | Thermal Conductivity (mW/mK) | Modulus (psi) | Strain at 5 psi |
|---|---|---|---|---|---|
| 10 | 10% GLYMO-APTES | 0.065 | 18.7 | 17.7 | 37.5 |
| 11 | 25% GLYMO-APTES | 0.061 | 21.3 | 14.5 | 39.5 |
| 12 | 50% GLYMO-APTES | 0.055 | 24.3 | 9.0 | 47.5 |
| 13 | 75% GLYMO-APTES | 0.051 | 25.2 | 4.5 | 58.5 |

BET surface areas, pore volumes, and average pore diameters of the samples obtained are listed in Table 7. Aerogels containing 10% and 25% polymer have approximately the same surface areas. The observed BJH pore volumes are much lower than those calculated based on the density and indicates that these low density samples contain macropores that are not detected by gas adsorption methods.

TABLE 7

BET surface area, BJH pore volume and average
pore diameter of GLYMO-APTES aerogel.

| Sample No | Sample composition | BET Surface area (m²/g) | BJH desorption cumulative pore volume (cm³/g) | Calc. pore volume (cm³/g) | BJH desorption average pore diameter (nm) |
|---|---|---|---|---|---|
| 10 | 10% GLYMO-APTES | 915.66 | 2.25 | 14.88 | 8.33 |
| 11 | 25% GLYMO-APTES | 922.63 | 2.44 | 15.89 | 9.54 |
| 12 | 50% GLYMO-APTES | 879.47 | 2.20 | 17.68 | 9.86 |
| 13 | 75% GLYMO-APTES | 573.48 | 1.37 | 19.11 | 10.13 |

What is claimed is:

1. Hybrid silica aerogel compositions comprising a non-polymeric, functional organic material covalently bonded at one or both ends to the silica network through a C—Si bond between a carbon atom of the organic material and a silicon atom of the network, wherein the non-polymeric, functional organic material is an amine-epoxy adduct.

2. The hybrid aerogel composition of claim 1, wherein the functional, non-polymeric organic material comprises branched or unbranched alkyl chains of C1-C40 with at least one of OH, NHR, SH, OH-terminated alkoxy, carboxy, phenolic groups are attached to the chain, and wherein a heteroatom may optionally be a part of the chain.

3. The hybrid aerogel composition of claim 2, wherein the functional, non-polymeric organic material is the reaction product of a glycidyloxyalkyl-trialkoxysilane and an aminoalkyl-trialkoxysilane.

4. The hybrid aerogel composition of claim 3, wherein the glycidoalkyl-trialkoxysilane is 3-glycidopropyl-trialkoxysilane; and the aminoalkyl-trialkoxysilane is 3-aminopropyl trialkoxysilane.

5. The hybrid aerogel composition of claim 2, wherein the functional, non-polymeric organic material is the reaction product of an alkyldiol diglycidyl ether and aminoalkyl-trialkoxysilanes.

6. The hybrid aerogel composition of claim 5, wherein the alkyldiol diglycidyl ether is butaneldiol diglycidyl ether; and the aminoalkyl-trialkoxysilanes are 3-aminopropyl trialkoxysilanes.

7. The hybrid aerogel composition of claim 2, further comprising at least one functional additive.

8. The hybrid aerogel composition of claim 2, wherein the composition is reinforced with fibers.

9. A method of preparing hybrid silica aerogel compositions comprising the steps of:
   a. combining at least one partially or fully hydrolyzed tetraalkoxysilane, at least one trialkoxysilane covalently bonded to a non-polymeric, functional organic material, and a gelation catalyst to gel the admixture, and
   b. drying the gel to obtain an aerogel;
   wherein the non-polymeric, functional organic material is an amine-epoxy adduct.

10. The method of claim 9, wherein the functional, non-polymeric organic material comprises branched or unbranched alkyl chains of C1-C40 with at least one of OH, NHR, SH, OH-terminated alkoxy, carboxy, phenolic groups are attached to the chain, and wherein a heteroatom may optionally be a part of the chain.

11. The method of claim 10, wherein the functional, non-polymeric organic material is the reaction product of a glycidyloxyalkyl-trialkoxysilane and an aminoalkyl-trialkoxysilane.

12. The method of claim 11, wherein the glycidoalkyl-trialkoxysilane is 3-glycidopropyl-trialkoxysilane; and the aminoalkyl-trialkoxysilane is 3-aminopropyl trialkoxysilane.

13. The method of claim 10, wherein the functional, non-polymeric organic material is the reaction product of an alkyldiol diglycidyl ether and aminoalkyl-trialkoxysilanes.

14. The method of claim 13, wherein the alkyldiol diglycidyl ether is butaneldiol diglycidyl ether; and the aminoalkyl-trialkoxysilanes are 3-aminopropyl trialkoxysilanes.

15. The method of claim 10, further comprising an aging step after the gelation step, comprising contacting the silanes with an amine containing material.

16. The method of claim 10, wherein the tetraalkoxysilane comprises between about 10 and about 75% of hydrolysed siloxane.

17. The method of claim 10, further comprising the step of adding at least one functional additive.

18. The method of claim 10, further comprising the step of adding reinforcing fibers.

19. The method of claim 10, wherein the gel is dried using supercritical carbon dioxide.

20. A method of preparing hybrid silica aerogel compositions comprising the steps of:
   a. combining at least one partially or fully hydrolyzed tetraalkoxysilane, at least one trialkoxysilane covalently bonded to a non-polymeric, functional organic material free of a urea or a urethane linkage, and a gelation catalyst to gel the admixture, and
   b. drying the gel to obtain an aerogel.

* * * * *